United States Patent
Park

(10) Patent No.: US 10,948,766 B2
(45) Date of Patent: Mar. 16, 2021

(54) LIGHT SOURCE-SIDE POLARIZING PLATE INCLUDING PRIMER LAYERS HAVING DIFFERENT REFRACTIVE INDEXES FOR LIQUID CRYSTAL DISPLAY DEVICE, AND LIQUID CRYSTAL DISPLAY DEVICE COMPRISING SAME

(71) Applicant: SAMSUNG SDI CO., LTD., Yongin-si Gyeonggi-do (KR)

(72) Inventor: Seok Jin Park, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/344,334

(22) PCT Filed: Sep. 18, 2017

(86) PCT No.: PCT/KR2017/010177
§ 371 (c)(1),
(2) Date: Apr. 23, 2019

(87) PCT Pub. No.: WO2018/080018
PCT Pub. Date: May 3, 2018

(65) Prior Publication Data
US 2020/0073171 A1    Mar. 5, 2020

(30) Foreign Application Priority Data
Oct. 31, 2016  (KR) .................. 10-2016-0143810

(51) Int. Cl.
*G02F 1/1335*  (2006.01)
*G02F 1/1339*  (2006.01)

(52) U.S. Cl.
CPC ...... *G02F 1/133528* (2013.01); *G02F 1/1339* (2013.01); *G02F 1/133502* (2013.01)

(58) Field of Classification Search
CPC ............ G02F 1/133528; G02F 1/1339; G02F 1/133502; G02F 1/13363; G02F 1/133634;
(Continued)

(56) References Cited

U.S. PATENT DOCUMENTS 9,684,105 B2 *   6/2017  Shin .................. G02B 5/3083
2005/0128411 A1 *  6/2005  Nagai .............. G02F 1/133634
349/141

(Continued)

FOREIGN PATENT DOCUMENTS

| CN | 104076429 A | 10/2014 |
| CN | 104487876 A | 4/2015 |
| CN | 105629367 A | 6/2016 |
| JP | 2013-254183 A | 12/2013 |
| KR | 10-2009-0053278 A | 5/2009 |
| KR | 10-2011-0014515 A | 2/2011 |
| KR | 10-2015-0027684 A | 3/2015 |
| KR | 10-2016-0011331 A | 2/2016 |

(Continued)

OTHER PUBLICATIONS

China Office Action from corresponding Chinese Patent Application No. 201780066935.1, China Office Action dated Oct. 29, 2020 (9 pgs.).

*Primary Examiner* — Angela K Davison
(74) *Attorney, Agent, or Firm* — Lewis Roca Rothgerber Christie LLP

(57) ABSTRACT

Provided are a light source-side polarizing plate including primer layers having different refractive indexes for a liquid crystal display device, and a liquid crystal display device comprising the same, the polarizing plate comprising a polarizer and a protective film formed on a light incidence surface of the polarizer, wherein the protective film includes a first primer layer, a protective film substrate, and a second primer layer, which are sequentially laminated on the polarizer, and when a refractive index of the second primer layer is np2, a refractive index of the first primer layer is np1, and refractive indexes of the protective film substrate in x-axis and y-axis directions are nx and ny, each of the first primer layer and the second primer layer has a thickness of 60 nm
(Continued)

to 120 nm, the refractive index difference np1−np2 of the first primer layer and the second primer layer is larger than 0 and equal to or smaller than 0.1, and the protective film substrate has a value of |nx−ny| which is larger than 0 and equal to or smaller than 0.01.

10 Claims, 1 Drawing Sheet

(58) Field of Classification Search
CPC ..... G02F 2001/133631; G02F 2413/09; G02F 2413/11; G02F 2413/12; G02B 5/30; G02B 1/14; G02B 1/04; G02B 5/3041; G02B 5/3083
See application file for complete search history.

(56) References Cited

U.S. PATENT DOCUMENTS

| | | | | |
|---|---|---|---|---|
| 2014/0293197 | A1* | 10/2014 | Shin | G02B 1/14 349/96 |
| 2016/0146980 | A1* | 5/2016 | Shin | G02B 5/3083 359/489.07 |
| 2019/0317353 | A1* | 10/2019 | Shim | G02F 1/13363 |

FOREIGN PATENT DOCUMENTS

| | | |
|---|---|---|
| KR | 10-2016-0038831 A | 4/2016 |
| KR | 10-2016-0063539 A | 6/2016 |

* cited by examiner

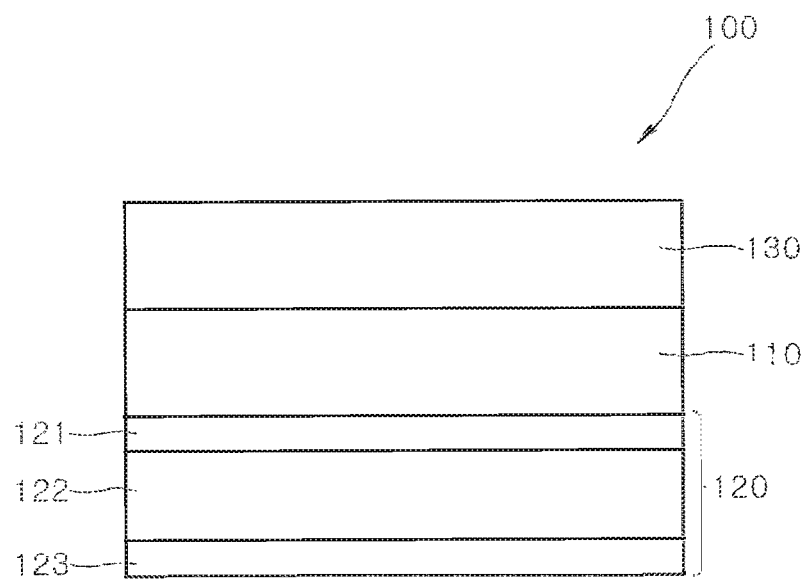

LIGHT SOURCE-SIDE POLARIZING PLATE INCLUDING PRIMER LAYERS HAVING DIFFERENT REFRACTIVE INDEXES FOR LIQUID CRYSTAL DISPLAY DEVICE, AND LIQUID CRYSTAL DISPLAY DEVICE COMPRISING SAME

CROSS-REFERENCE TO RELATED APPLICATIONS

This application is a National Phase Patent Application and claims priority to and the benefit of International Application Number PCT/KR2017/010177, filed on Sep. 18, 2017, which claims priority to and the benefit of Korean Patent Application No. 10-2016-0143810, filed on Oct. 31, 2016, the entire contents of each of which are incorporated herein by reference.

FIELD

The present invention relates to a light source-side polarizing plate for liquid crystal display devices and a liquid crystal display device including the same.

BACKGROUND

Polarizing plates are disposed on upper and lower surfaces of a liquid crystal panel to control oscillation directions of light in order to visualize a display pattern of a liquid crystal display device. The polarizing plate includes a polarizer and a protective film formed on at least one surface of the polarizer. The protective film is generally formed of a triacetylcellulose (TAC) film. The TAC film is more expensive than a typical polymer film. An inexpensive polyester-based polymer film including a polyethylene terephthalate (PET) film and the like is used to replace the TAC film.

A light source-side polarizing plate disposed between a liquid crystal panel and a backlight unit transmits light emitted from the backlight unit toward the liquid crystal panel. Therefore, there is a need for a suitable design for the light source-side polarizing plate of the liquid crystal panel in order to improve luminous efficacy.

The background technique of the present invention is disclosed in Korean Patent Laid-open Publication No. 2011-0014515.

SUMMARY

It is an aspect of the present invention to provide a light source-side polarizing plate for liquid crystal display devices, which can improve luminous efficacy of incident light emitted from a backlight unit.

It is another aspect of the present invention to provide a light source-side polarizing plate for liquid crystal display devices, which can improve transmittance of incident light emitted from a backlight unit.

It is a further aspect of the present invention to provide a light source-side polarizing plate for liquid crystal display devices, which can suppress visibility of rainbow mura.

It is yet another aspect of the present invention to provide a thin light source-side polarizing plate for liquid crystal display devices through application of a thin protective film.

In accordance with one aspect of the present invention, a light source-side polarizing plate for liquid crystal display devices includes a polarizer and a protective film formed on a light incidence surface of the polarizer, wherein the protective film includes a first primer layer, a protective film base material, and a second primer layer sequentially stacked on the polarizer, and satisfies the following Equation 1 or Equation 2, where np1 indicates a refractive index of the first primer layer, np2 indicates a refractive index of the second primer layer, and nx and ny indicate refractive indices of the protective film base material at a wavelength of 550 nm in the x-axis and y-axis directions thereof, respectively.

$$np2<np1<nx<ny \qquad <\text{Equation 1}>$$

$$np2<np1<ny<nx \qquad <\text{Equation 2}>$$

A difference in refractive index (np1−np2) between the first primer layer and the second primer layer may be greater than 0 to 0.1; each of the first primer layer and the second primer layer may have a thickness of 60 nm to 120 nm; and an absolute value (|nx−ny|) of a difference between nx and ny of the protective film base material may be greater than 0 to 0.01.

In accordance with another aspect of the present invention, a liquid crystal display device includes: a liquid crystal panel; a backlight unit disposed below the liquid crystal panel; and a polarizing plate disposed between the liquid crystal panel and the backlight unit, wherein the polarizing plate includes the polarizing plate according to the present invention.

The present invention provides a light source-side polarizing plate for liquid crystal display devices, which can improve luminous efficacy of incident light emitted from a backlight unit.

The present invention provides a light source-side polarizing plate for liquid crystal display devices, which can improve transmittance of incident light emitted from a backlight unit.

The present invention provides a light source-side polarizing plate for liquid crystal display devices, which can suppress visibility of rainbow mura.

The present invention provides a thin light source-side polarizing plate for liquid crystal display devices through application of a thin protective film.

BRIEF DESCRIPTION OF THE DRAWINGS

FIG. 1 is a sectional view of a polarizing plate according to one embodiment of the present invention.

DETAILED DESCRIPTION

Hereinafter, embodiments of the present invention will be described in detail with reference to the accompanying drawings such that the present invention can be easily realized by a person having ordinary knowledge in the art. It should be understood that the present invention may be implemented in different ways and is not limited to the following embodiments. In the drawings, portions irrelevant to the description will be omitted for clarity and like components will be denoted by like reference numerals throughout the specification.

As used herein, spatially relative terms such as "upper" and "lower" are defined with reference to the accompanying drawings. Thus, it will be understood that "upper" can be used interchangeably with "lower".

Herein, unless clearly stated otherwise, 'nx', 'ny', and 'nz' mean refractive indices of a protective film base material at a wavelength of 550 nm in three directions of the protective film base material (x-axis direction, y-axis direction, and z-axis direction (thickness direction)), respectively.

For example, the x-axis direction may be the machine direction (MD) or the slow-axis direction and the y-axis direction may be the transverse direction (TD) or the fast-axis direction.

Herein, the "refractive index" may be measured at a wavelength of 550 nm using a prism coupler.

Herein, the in-plane retardation Re may be represented by Equation 3:

$$Re=|nx-ny|\times d \qquad \text{<Equation 3>}$$

where nx and ny are the refractive indices of a protective film in the slow-axis and fast-axis directions thereof at a wavelength of 550 nm, respectively, and d is the thickness of the protective film (unit: nm).

Herein, the out-of-plane retardation Rth may be represented by Equation 4:

$$Rth=((nx+ny)/2+nz)\times d \qquad \text{<Equation 4>}$$

where nx, ny and nz are the refractive indices of the protective film in the slow-axis, fast-axis, and thickness directions thereof at a wavelength of about 550 nm, respectively, and d is the thickness of the protective film (unit: nm).

Herein, the degree of biaxiality NZ may be represented by Equation 5:

$$NZ=(nx-nx)/(nx-ny) \qquad \text{<Equation 5>}$$

where nx, ny and nz are the refractive indices of the protective film in the slow-axis, fast-axis, and thickness directions thereof at a wavelength of about 550 nm, respectively.

Herein, the "light source-side polarizing plate for liquid crystal display devices" means a polarizing plate disposed between a backlight unit and a liquid crystal panel to transmit light emitted from the backlight unit toward the liquid crystal panel. Preferably, the light source-side polarizing plate for liquid crystal display devices is bonded to the liquid crystal panel via an adhesive layer and may be disposed between the liquid crystal panel and the backlight unit.

Hereinafter, a polarizing plate according to one embodiment of the invention will be described with reference to FIG. 1. FIG. 1 is a sectional view of a polarizing plate according to one embodiment of the present invention.

Referring to FIG. 1, a polarizing plate 100 according to one embodiment may include a polarizer 110, a first protective film 120, and a second protective film 130.

The polarizer 110 may polarize light having passed through the first protective film 120.

The polarizer 110 is composed of a polyvinyl alcohol film and may be manufactured by any method so long as the polarizer is composed of the polyvinyl alcohol film. For example, the polarizer may be manufactured using a modified polyvinyl alcohol film, such as a partially formalized polyvinyl alcohol film, an acetoacetyl group-modified polyvinyl alcohol film, and the like. Specifically, the polarizer may be manufactured by dyeing the polyvinyl alcohol film with iodine or dichroic dyes, followed by stretching the dyed polyvinyl alcohol film in the machine direction (MD). Specifically, the polarizer is manufactured through swelling, dyeing, and stretching the polyvinyl alcohol film. A method for each of these processes is well known to those skilled in the art. The polarizer 110 may have a thickness of 3 μm to 30 μm, specifically 15 μm to 25 μm. Within this range, the polarizer can be used in a polarizing plate.

The first protective film 120 is formed on a light incidence surface of the polarizer 110 to allow light emitted from the backlight unit to enter the polarizer 110 therethrough.

Herein, since the polarizing plate 100 is used as a light source-side polarizing plate for liquid crystal display devices, light emitted from the backlight unit of the liquid crystal display device primarily passes through the polarizing plate. Accordingly, the polarizing plate 100 according to the present invention is aimed at improving efficiency of light.

The inventors of the present invention developed the first protective film 120 by sequentially stacking a first primer layer 121, a protective film base material 122, and a second primer layer 123 on the polarizer 110, in which the first protective film 120 satisfied the following Equation 1 or 2, a difference in refractive index (np1−np2) between the first primer layer 121 and the second primer layer 123 was set to be greater than 0 to 0.1; each of the first primer layer 121 and the second primer layer 123 was set to have a thickness of 60 nm to 120 nm; and an absolute value (|nx−ny|) of a difference between nx and ny of the protective film base material 122 was set to be greater than 0 to 0.01 or less, where np1 indicates the refractive index of the first primer layer 121, np2 indicates the refractive index of the second primer layer 123, and nx and ny indicate the refractive indices of the protective film base material 122 in the x-axis and y-axis directions thereof, respectively. Within these ranges, while light emitted from the backlight unit passes through the second primer layer, the protective film base material and the first primer layer, the first protective film can have increased transmittance of the light to improve efficiency of the light while suppressing visibility of rainbow mura. Although a typical primer layer serves to achieve efficient attachment of the protective film to the polarizer, the protective film according to the present invention further includes the second primer layer disposed at the outermost side of the protective film base material with respect to a backlight unit in a liquid crystal display device such that light emitted from the backlight unit sequentially passes through an air layer, the second primer layer, the protective film base material, and the first primer layer in order to improve efficiency of light through significant improvement in transmittance.

$$np2<np1<nx<ny \qquad \text{<Equation 1>}$$

$$np2<np1<ny<nx \qquad \text{<Equation 2>}$$

In particular, according to the present invention, the first protective film 120 is formed to increase light transmittance while reducing haze, thereby improving efficiency of light emitted from the backlight unit. Preferably, the first protective film has a haze of 5% or less, for example, 2% or less, preferably 1% or less, or 0.9% or less. Preferably, the first protective film has a transmittance of 93% or more. Within this range, the first protective film can improve efficiency of light.

The protective film base material 122 may have an in-plane retardation Re of 500 nm or less, preferably 350 nm or less, or 100 nm to 300 nm, at a wavelength of 550 nm. Within this range, the protective film base material can prevent rainbow mura from being visible.

The protective film base material 122 may have a refractive index of 1.60 to 1.70, preferably 1.64 to 1.66. Within this range, the protective film base material including the first primer layer and the second primer layer can improve light transmittance while reducing haze. The refractive index of the protective film base material 122 within this range can be achieved by controlling the kind of resin and the amount of each of monomers in a resin forming the protective film base material 122.

An absolute value (|nx−ny|) of a difference between nx and ny of the protective film base material 122 may be greater than 0 to 0.01 or less, specifically 0.005 to 0.01. Within this range, the protective film base material 122 can have further improved viewing angle and can prevent generation of rainbow spots.

The protective film base material 122 may have an out-of-plane retardation Rth of 6,000 nm or more, preferably 6,500 nm to 8,000 nm, 6,800 nm to 7,200 nm, or 6,500 nm to 7,000 nm, at a wavelength of 550 nm. Within this range, the protective film base material can achieve more efficient suppression of rainbow mura. The protective film base material 122 may have a degree of biaxiality (NZ) of 15 or more, preferably 15 to 20, at a wavelength of 550 nm. Within this range, the protective film base material can achieve more efficient suppression of rainbow mura.

The protective film base material 122 may be formed of an optically transparent polyester resin. Specifically, the polyester resin may include polyethylene terephthalate, polybutylene terephthalate, polyethylene naphthalate, polybutylene naphthalate, and the like. Preferably, the protective film base material is a polyethylene terephthalate base material.

The protective film base material 122 may have a thickness of 30 µm to 80 µm, preferably 40 µm to 60 µm. Within this range, the protective film base material can be used in an optical display device.

The protective film base material 122 may be manufactured by melting and extruding a resin for protective films, followed by biaxially stretching the extruded resin to a preset elongation. For example, the protective film base material 122 may be manufactured by stretching the resin for protective films to 2 to 4 times an initial length of the film in the MD thereof and to 2 to 4 times an initial length of the film in the TD thereof after melt extrusion of the resin. Stretching may be realized by sequential MD and TD stretching or simultaneous MD and TD stretching. Stretching may be performed by a typical method known to those skilled in the art, such as wet stretching and dry stretching. The in-plane retardation, the out-of-plane retardation and/or the degree of biaxiality of the protective film base material 122 may be achieved in the above ranges by controlling the MD and TD elongations, the stretching temperature, stretching time, and the like.

The first primer layer 121 allows efficient bonding of the protective film base material 122 to the polarizer 110. Within the thickness range described above, the first primer layer 121 can prevent rainbow mura from being visible while improving transmittance. In particular, visibility of rainbow mura is typically determined by a viewer-side polarizing plate in the liquid crystal display device, whereas the light source-side polarizing plate according to the present invention is provided to the liquid crystal display device to suppress rainbow mura from being visible. Specifically, the first primer layer 121 may have a thickness of 60 nm to 120 nm, preferably 80 nm to 120 nm, or 80 nm to 100 nm. Within this thickness range, the first primer layer allows efficient bonding of the protective film base material to the polarizer and can prevent rainbow mura from being visible while improving transmittance.

At least one of the first primer layer 121 and the second primer layer 123 may have a refractive index of greater than 1.5, preferably greater than 1.5 to 1.7 or less. Within this range, the first and second primer layers can improve transmittance of light emitted from the backlight unit to improve efficiency of the light while reducing haze of the first protective film to improve efficiency of the light emitted from the backlight unit and having passed through an air layer. Preferably, both the first primer layer 121 and the second primer layer 123 have a refractive index of greater than 1.5. As a result, the first protective film may have a haze of 2% or less, for example, 1% or less, or 0.9% or less. Within this range, the first protective film can improve efficiency of light emitted from the backlight unit.

In one embodiment, the first primer layer 121 may have a refractive index np1 of greater than 1.5, preferably greater than 1.5 to 1.7 or less. Within this range, the first primer layer can increase transmittance of the polarizing plate while reducing haze of the first protective film, thereby improving efficiency of light.

The first primer layer 121 may be formed of at least one of a polyester resin containing a hydrophilic group and a hydrophobic group, a polyvinyl acetate resin, a polyurethane resin, and a combination thereof, without being limited thereto.

The refractive index of the first primer layer 121 within the above range may be achieved by a suitable method through control of the amount or kind of the polyester resin, the polyvinyl acetate resin, or the polyurethane resin.

The second primer layer 123 is formed on a light incidence surface of the protective film base material 122 and has a different refractive index than the first primer layer 121 to improve light use efficiency through improvement in light transmittance by providing a difference in refractive index between the first primer layer and the second primer layer.

In one embodiment, the second primer layer 123 may have a refractive index np2 of greater than 1.5, preferably greater than 1.5 to 1.7 or less. Within this range, the second primer layer can increase transmittance of the polarizing plate, can reduce haze of the first protective film to improve efficiency of light, and can improve efficiency of light having passed through the air layer.

The second primer layer 123 may have the same thickness as or a different thickness than the first primer layer 121. For example, the second primer layer 123 may have a thickness of 60 nm to 120 nm, preferably 80 nm to 120 nm, or 80 nm to 90 nm. Within this range, the second primer layer can prevent rainbow mura from being visible while improving transmittance.

The second primer layer 123 may be formed of the same material as or a different material than the first primer layer 121. For example, the second primer layer 123 may be formed of at least one of a polyester resin containing a hydrophilic group and a hydrophobic group, a polyvinyl acetate resin, a polyurethane resin, and a combination thereof, without being limited thereto.

The refractive index of the second primer layer 123 as set forth above may be obtained by a suitable method through control of the amount or kind of the polyester resin, the polyvinyl acetate resin, or the polyurethane resin.

The first protective film 120 may have a thickness of 20 µm to 100 µm, preferably 40 µm to 80 µm. Within this range, the first protective film can be used in the polarizing plate.

The second protective film 130 may be formed on an upper surface of the polarizer 110, that is, a light exit surface of the polarizer 110 to transmit light received from the polarizer 110 toward the liquid crystal panel.

The second protective film 130 may be a film formed of an optically transparent resin. Specifically, the optically transparent resin may include at least one of cellulose ester resins including triacetylcellulose and the like, polyester resins including polyethylene terephthalate, polybutylene terephthalate, polyethylene naphthalate, polybutylene naphthalate, and the like, cyclic polyolefin resins including amorphous cyclic olefin polymer (COP), polycarbonate resins, polyether sulfone resins, polysulfone resins, polyamide resins, polyimide resins, non-cyclic polyolefin resins, polyacrylate resins including poly(methyl methacrylate), polyvinyl alcohol resins, polyvinyl chloride resins, and polyvinylidene chloride resins.

The second protective film 130 may have a thickness of 20 μm to 100 μm, preferably 40 μm to 80 μm. Within this range, the second protective film can be used in the polarizing plate.

The polarizing plate 100 may have a thickness of 25 μm to 500 μm. Within this range, the polarizing plate can be used in the liquid crystal display device. The polarizing plate 100 may have a degree of polarization of 99.99% or more, for example, 99.99% to 99.999%, and a transmittance of 40% or more, for example, 40% to 80% (measured in the visible range, for example, at a wavelength of 550 nm). Within this range, the polarizing plate 100 can prevent deterioration in optical properties when mounted on the liquid crystal display device.

Although not shown in FIG. 1, each of the first protective film 120 and the second protective film 130 may be bonded to the polarizer 110 via a bonding layer for polarizing plates. The bonding layer may include a typical bonding agent, for example, at least one of a water-based bonding agent, a pressure sensitive bonding agent, and a photocurable bonding agent. In addition, although not shown in FIG. 1, an adhesive layer may be further formed on an upper surface of the second protective film 130 such that the polarizing plate can be stacked on the liquid crystal display panel via the adhesive layer. The adhesive layer may include a pressure sensitive adhesive, but is not limited thereto.

An optical display device according to the present invention may include a liquid crystal display device including the polarizing plate according to the embodiments of the invention. The liquid crystal display device may include: a liquid crystal display panel; a first polarizing plate formed on an upper surface of the liquid crystal display panel; a backlight unit disposed below the liquid crystal display panel; and a second polarizing formed on the lower surface of the liquid crystal display panel to be disposed between the liquid crystal display panel and the backlight unit, wherein the second polarizing plate may include the polarizing plate according to the embodiments of the invention.

The liquid crystal display panel includes a liquid crystal panel including a liquid crystal cell layer encapsulated between a first substrate and a second substrate. In one embodiment, the first substrate may be a color filter (CF) substrate (upper substrate) and the second substrate may be a thin film transistor (TFT) substrate (lower substrate). The first substrate and the second substrate may be the same or different and may be a glass substrate or a plastic substrate. The plastic substrate may be formed of a plastic material applicable to a flexible display, such as polyethylene terephthalate (PET), polycarbonate (PC), polyimide (PI), polyethylene naphthalate (PEN), polyether sulfone (PES), polyarylate (PAR), and cycloolefin copolymer (COC), without being limited thereto. The liquid crystal cell layer may include liquid crystals driven in a vertical alignment (VA) mode, an in-place switching (IPS) mode, a fringe field switching (FFS) mode, or a twisted nematic (TN) mode.

The first polarizing plate may include a typical polarizing plate.

The backlight unit is typically used in a liquid crystal display device and may include a light source, a light guide plate, a reflection plate, a diffusion plate, and the like.

Next, the present invention will be described in more detail with reference to some examples. However, it should be noted that these examples are provided for illustration only and are not to be construed in any way as limiting the present invention.

Example 1

A polarizer was prepared by stretching a polyvinyl alcohol film (VF-PS6000, Kuraray Co., Ltd., thickness: 60 μm) to 3 times an initial length thereof at 60° C., dyeing the stretched film with iodine, and stretching the dyed film to 2.5 times the length of the stretched film in a boric acid solution at 40° C.

A film prepared through melt extrusion of a polyethylene terephthalate (PET) resin was stretched to 3 times an initial length thereof in the MD while mechanically moving the film on rolls in the MD, followed by stretching the film to 3 times an in initial length thereof in the TD, thereby preparing a polyethylene terephthalate film. The polyethylene terephthalate film had a thickness of 40 μm, Re of 185 nm according to Equation 3, Rth of 6,800 nm according to Equation 4, and NZ of 19 according to Equation 5 at a wavelength of 550 nm. The prepared polyethylene terephthalate film was used as a base material of a first protective film. Re, NZ, and Rth were measured using a retardation meter (Axoscan, AxoMetric Inc.) at a wavelength of 550 nm.

A first primer layer and a second primer layer each having a refractive index and a thickness as listed in Table 1 were formed on both surfaces of the prepared polyethylene terephthalate film. The first were formed of a polyester resin and second primer layers were formed of a polyurethane resin, which have the corresponding refractive indices, respectively.

A polarizing plate was prepared by bonding the first protective film to one surface of the polarizer via a bonding agent for polarizing plates deposited on the one surface of the polarizer and bonding a second protective film (triacetylcellulose film, Zero TAC, thickness: 80 μm) to the other surface of the polarizer via a bonding agent for polarizing plates deposited on the other surface of the polarizer. The first protective film includes a first primer layer, a protective film base material, and a second primer layer sequentially stacked on the polarizer.

Examples 2 to 4

A polarizing plate was prepared by the same method as in Example 1 except that the refractive index and retardation of the polyethylene terephthalate film, and the refractive index or thickness of the first primer layer and the second primer layer were changed as listed in Table 1.

Comparative Examples 1 to 5

A polarizing plate was prepared by the same method as in Example 1 except that the refractive index and retardation of the polyethylene terephthalate film, and the refractive index or thickness of the first primer layer and the second primer layer were changed as listed in Table 1.

The protective film and the polarizing plate prepared in Examples and Comparative Examples were evaluated as to the following properties and results are shown in Table 1.

(1) Transmittance and haze: Transmittance and haze of the first protective film were measured at a wavelength of 300 nm to 800 nm using an NDH-5000.

(2) Mura evaluation: A specimen for evaluation of mura was prepared by placing each of the polarizing plates of Examples and Comparative Examples between a backlight unit and a light source with respect to a liquid crystal panel (VA mode) in a liquid crystal display device (32"), and placing a polarizing plate at a viewer side of the liquid crystal panel. Mura was evaluated according to the following criteria upon application of power to the liquid crystal display device. Mura was evaluated from Level 0 to Level 10 with the naked eye. A lower level indicates less visibility of rainbow mura.

the protective film satisfying Equation 1 or Equation 2, where np1 indicates a refractive index of the first primer layer, np2 indicates a refractive index of the second primer layer, and nx and ny indicate refractive indices of the protective film base material at a wavelength of 550 nm in x-axis and y-axis directions thereof, respectively:

$$np2<np1<nx<ny \qquad \text{<Equation 1>}$$

$$np2<np1<ny<nx; \qquad \text{<Equation 2>}$$

TABLE 1

|  | Protective film base material | | | First primer layer | | Second primer layer | | | | |
| --- | --- | --- | --- | --- | --- | --- | --- | --- | --- | --- |
|  | nx | ny | Re (nm) | np1 | Thickness (nm) | np2 | Thickness (nm) | Transmittance (%) | Haze (%) | Mura |
| Example 1 | 1.661 | 1.655 | 185 | 1.56 | 80 | 1.51 | 90 | 93.7 | 0.84 | 2.5 |
| Example 2 | 1.661 | 1.655 | 185 | 1.56 | 120 | 1.51 | 120 | 93.0 | 0.86 | 2.5 |
| Example 3 | 1.655 | 1.661 | 180 | 1.56 | 80 | 1.51 | 90 | 93.7 | 0.83 | 2.5 |
| Example 4 | 1.660 | 1.650 | 244 | 1.56 | 80 | 1.51 | 90 | 93.4 | 0.85 | 3.5 |
| Comparative Example 1 | 1.661 | 1.655 | 183 | 1.56 | 80 | 1.56 | 90 | 92.5 | 0.94 | 2.5 |
| Comparative Example 2 | 1.661 | 1.655 | 185 | 1.54 | 40 | 1.56 | 90 | 91.7 | 0.98 | 2.5 |
| Comparative Example 3 | 1.661 | 1.655 | 182 | 1.56 | 40 | 1.51 | 50 | 92.2 | 0.95 | 2.5 |
| Comparative Example 4 | 1.655 | 1.668 | 365 | 1.56 | 80 | 1.51 | 90 | 92.3 | 0.95 | 4.5 |
| Comparative Example 5 | 1.668 | 1.655 | 361 | 1.56 | 80 | 1.51 | 90 | 92.2 | 0.94 | 4.5 |

As shown in Table 1, the polarizing plates according to the present invention include a protective film having low haze and high transmittance, thereby improving luminous efficacy. In addition, the polarizing plate according to the present invention can suppress rainbow mura.

On the contrary, in the polarizing plate of Comparative Example 1 in which np1−np2 was 0, the polarizing plates of Comparative Examples 2 and 3, the primer layer of which had a thickness out of the range according to the present invention, and the polarizing plates of Comparative Examples 4 and 5, in which |nx−ny| did not fall within the range according to the present invention, the protective films had higher haze and lower transmittance than that of the polarizing plate according to the present invention and thus failed to achieve improvement in luminous efficacy.

It should be understood that various modifications, changes, alterations, and equivalent embodiments can be made by those skilled in the art without departing from the spirit and scope of the present invention.

The invention claimed is:

1. A light source-side polarizing plate for liquid crystal display devices, comprising:
   a polarizer; and
   a protective film formed on a light incidence surface of the polarizer,
   wherein the protective film comprises a first primer layer, a protective film base material, and a second primer layer sequentially stacked on the polarizer,
   and wherein a difference in refractive index (np1−np2) between the first primer layer and the second primer layer is greater than 0 and equal to or less than 0.1;
   each of the first primer layer and the second primer layer has a thickness of 60 nm to 120 nm; and
   an absolute value (|nx−ny|) of a difference between nx and ny of the protective film base material is greater than 0 and equal to or less than 0.01.

2. The light source-side polarizing plate for liquid crystal display devices according to claim 1, wherein at least one of the first primer layer and the second primer layer has a refractive index of greater than 1.5 and equal to or less than 1.7.

3. The light source-side polarizing plate for liquid crystal display devices according to claim 1, wherein the first primer layer has a refractive index of greater than 1.5 and the second primer layer has a refractive index of greater than 1.5.

4. The light source-side polarizing plate for liquid crystal display devices according to claim 1, wherein the protective film has a haze of 0.83% to 2%.

5. The light source-side polarizing plate for liquid crystal display devices according to claim 1, wherein the protective film has a transmittance of 93% to 93.7%.

6. The light source-side polarizing plate for liquid crystal display devices according to claim 1, wherein the protective film base material has an in-plane retardation Re of 500 nm or less and equal to or greater than 100 nm at a wavelength of 550 nm.

7. The light source-side polarizing plate for liquid crystal display devices according to claim 1, wherein the protective film base material is a polyester base material.

8. The light source-side polarizing plate for liquid crystal display devices according to claim 1, wherein the protective film base material comprises at least one of polyethylene terephthalate, polybutylene terephthalate, polyethylene naphthalate, and polybutylene naphthalate.

9. The light source-side polarizing plate for liquid crystal display devices according to claim 1, further comprising: a protective film formed on a light exit surface of the polarizer.

10. A liquid crystal display device comprising: a liquid crystal panel; a backlight unit disposed below the liquid crystal panel; and a polarizing plate disposed between the liquid crystal panel and the backlight unit,
wherein the polarizing plate comprises the light source-side polarizing plate for liquid crystal display devices according to claim 1.

* * * * *